United States Patent
Andrews et al.

(10) Patent No.: US 9,908,703 B2
(45) Date of Patent: Mar. 6, 2018

(54) ROBOTIC STORAGE ASSEMBLY

(71) Applicants: Brandon Andrews, Warner Robins, GA (US); Steve Andrews, Warner Robins, GA (US)

(72) Inventors: Brandon Andrews, Warner Robins, GA (US); Steve Andrews, Warner Robins, GA (US)

( * ) Notice: Subject to any disclaimer, the term of this patent is extended or adjusted under 35 U.S.C. 154(b) by 0 days.

(21) Appl. No.: 15/131,274

(22) Filed: Apr. 18, 2016

(65) Prior Publication Data

US 2017/0297819 A1 Oct. 19, 2017

(51) Int. Cl.
| | | |
|---|---|---|
| B65G 1/137 | (2006.01) | |
| B65G 1/04 | (2006.01) | |
| B25J 11/00 | (2006.01) | |
| B25J 13/06 | (2006.01) | |
| B25J 15/00 | (2006.01) | |
| B25J 15/08 | (2006.01) | |
| E05G 1/08 | (2006.01) | |
| E05G 1/02 | (2006.01) | |

(52) U.S. Cl.
CPC .............. *B65G 1/137* (2013.01); *B25J 11/00* (2013.01); *B25J 13/06* (2013.01); *B25J 15/0028* (2013.01); *B25J 15/08* (2013.01); *B65G 1/0464* (2013.01); *E05G 1/02* (2013.01); *E05G 1/08* (2013.01)

(58) Field of Classification Search
CPC ...... B65G 1/137; G07F 11/165; G07F 11/167
USPC .................. 414/266–269, 281–283
See application file for complete search history.

(56) References Cited

U.S. PATENT DOCUMENTS

| | | | |
|---|---|---|---|
| D291,019 S | | 7/1987 | Druihet |
| 5,447,297 A | * | 9/1995 | Murata .................. B42C 1/125 |
| | | | 270/58.02 |
| 7,780,081 B1 | | 8/2010 | Liang |
| 8,260,692 B1 | | 9/2012 | Miller et al. |
| 8,633,829 B2 | | 1/2014 | Cavanaugh |
| 9,135,403 B1 | * | 9/2015 | Tolmosoff ........... G06F 19/3462 |
| 2001/0000610 A1 | * | 5/2001 | Johnson .................. G07F 11/42 |
| | | | 221/13 |
| 2004/0262946 A1 | * | 12/2004 | Rasmussen ............ A47C 17/84 |
| | | | 296/156 |
| 2007/0085655 A1 | | 4/2007 | Wildman et al. |
| 2012/0281889 A1 | | 11/2012 | Yang |
| 2014/0379123 A1 | * | 12/2014 | Hirshbain ............. G07F 11/165 |
| | | | 700/236 |

FOREIGN PATENT DOCUMENTS

WO  WO2005077109  8/2005

* cited by examiner

*Primary Examiner* — Gerald McClain
*Assistant Examiner* — Ronald Jarrett

(57) ABSTRACT

A robotic storage assembly includes a safe that may a plurality of items. A drawer is slidably coupled to the safe. A control is coupled to the safe and the control may be manipulated. A storage unit is positioned within the safe to contain the plurality of items. The storage unit includes a plurality of trays. A spacing unit is positioned within the safe and the spacing unit engages the plurality of trays. The spacing unit selectively spaces the trays apart from each other. A retrieval unit is positioned within the safe. The retrieval unit is selectively positioned between the trays when the trays are spaced apart. Thus, the retrieval unit retrieves the items in the storage unit. The retrieval unit is selectively aligned with the drawer to deposit the items in the drawer. Thus, the items may be removed from the safe.

13 Claims, 9 Drawing Sheets

ROBOTIC STORAGE ASSEMBLY

BACKGROUND OF THE DISCLOSURE

Field of the Disclosure

The disclosure relates to storage devices and more particularly pertains to a new storage device for robotically depositing and retrieving items from a safe.

SUMMARY OF THE DISCLOSURE

An embodiment of the disclosure meets the needs presented above by generally comprising a safe that may contain a plurality of items. A drawer is slidably coupled to the safe. A control is coupled to the safe and the control may be manipulated. A storage unit is positioned within the safe to contain the plurality of items. The storage unit includes a plurality of trays. A spacing unit is positioned within the safe and the spacing unit engages the plurality of trays. The spacing unit selectively spaces the trays apart from each other. A retrieval unit is positioned within the safe. The retrieval unit is selectively positioned between the trays when the trays are spaced apart. Thus, the retrieval unit retrieves the items in the storage unit. The retrieval unit is selectively aligned with the drawer to deposit the items in the drawer. Thus, the items may be removed from the safe.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The items of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and items other than those set forth above will become apparent when consideration is given to the following detailed description thereof. Such description makes reference to the annexed drawings wherein.

DESCRIPTION OF THE PREFERRED EMBODIMENT

Figure 1:
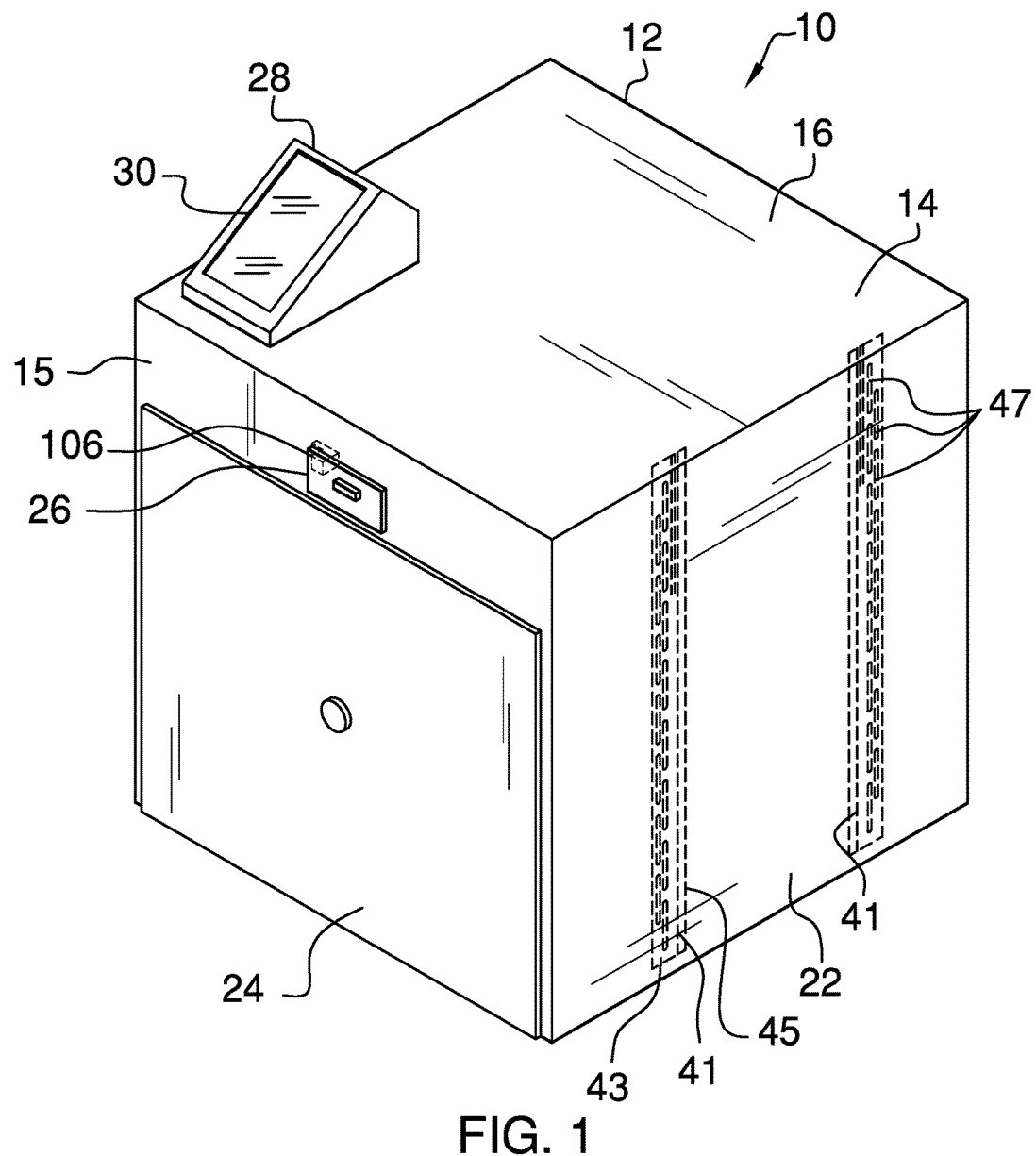
FIG. 1 is a front perspective view of a robotic storage assembly according to an embodiment of the disclosure.
Figure 2:
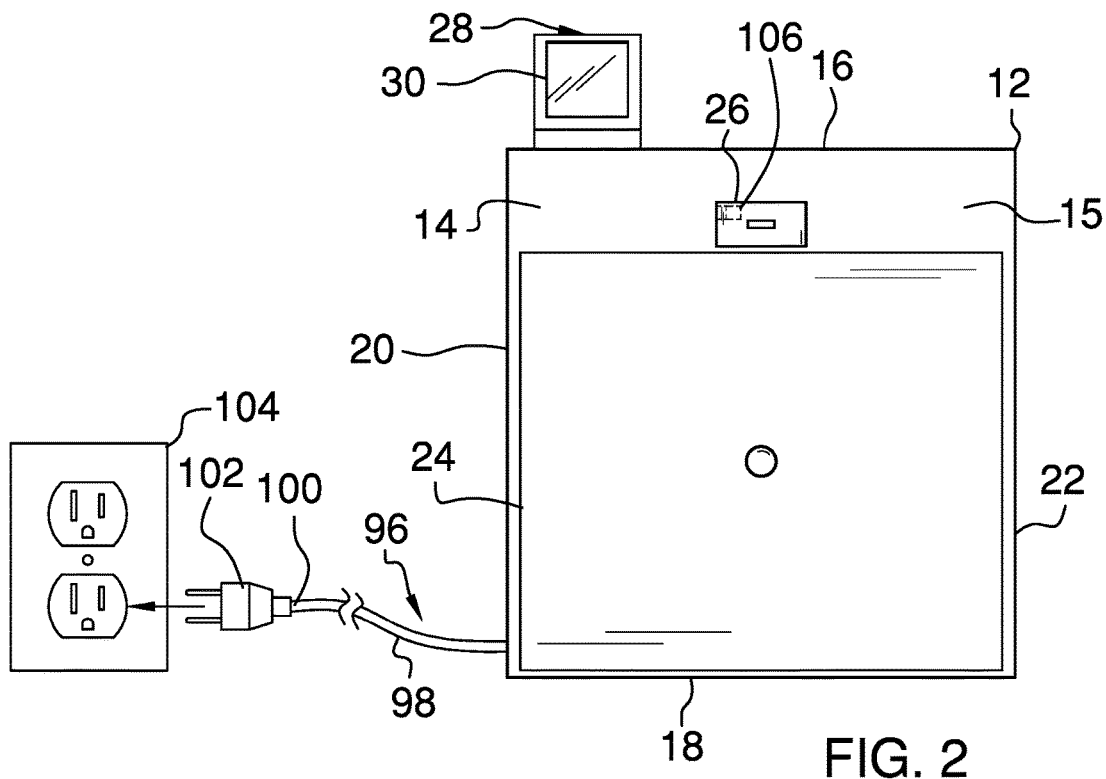
FIG. 2 is a front view of an embodiment of the disclosure.
Figure 3:
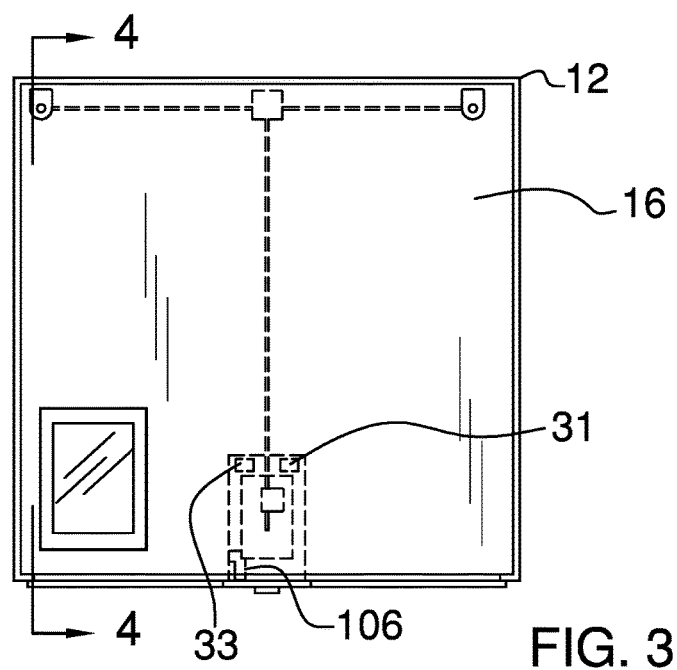
FIG. 3 is a top phantom view of an embodiment of the disclosure.
Figure 4:
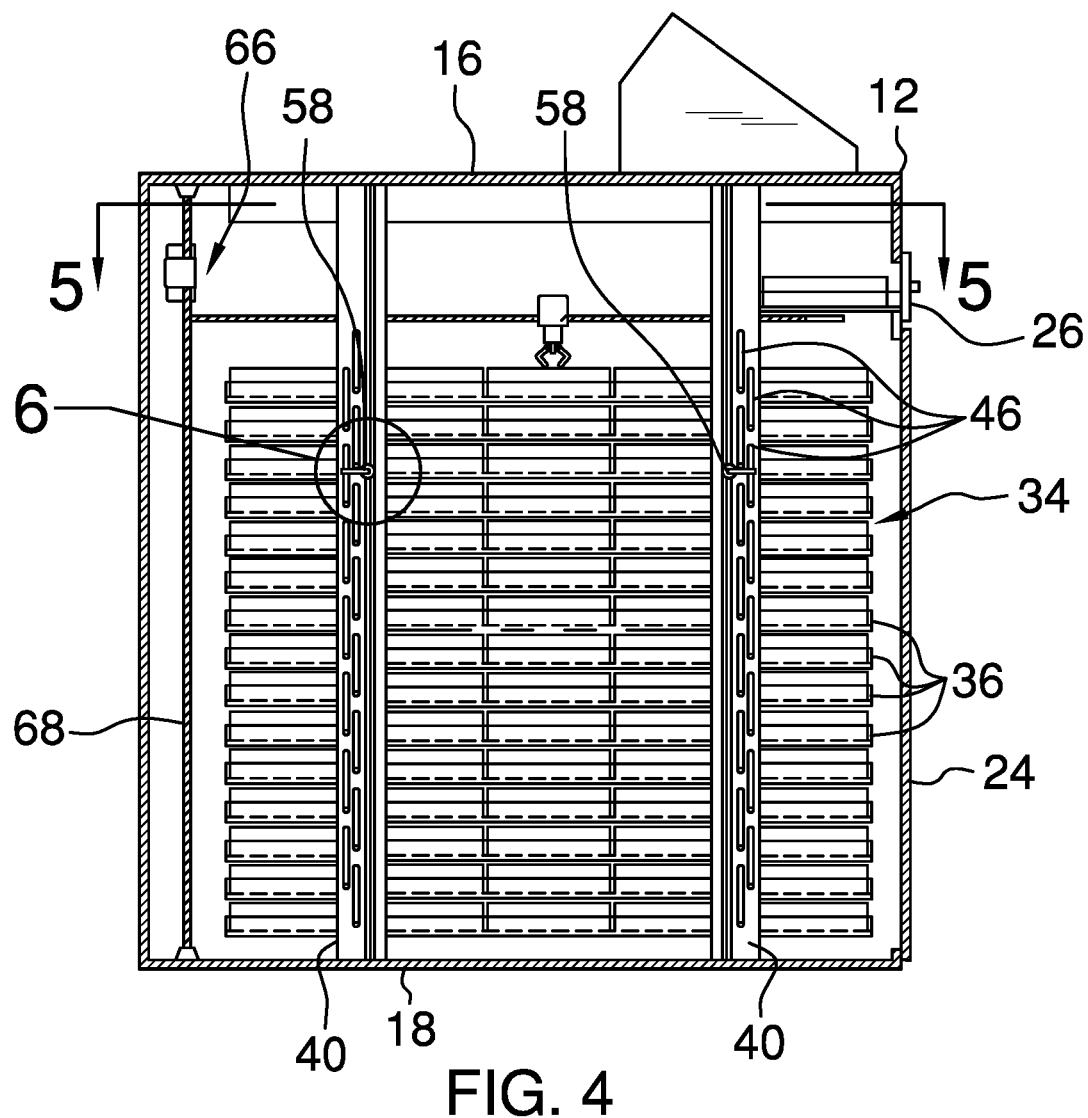
FIG. 4 is a cross sectional view taken along line 4-4 of FIG. 3 of an embodiment of the disclosure.
Figure 5:
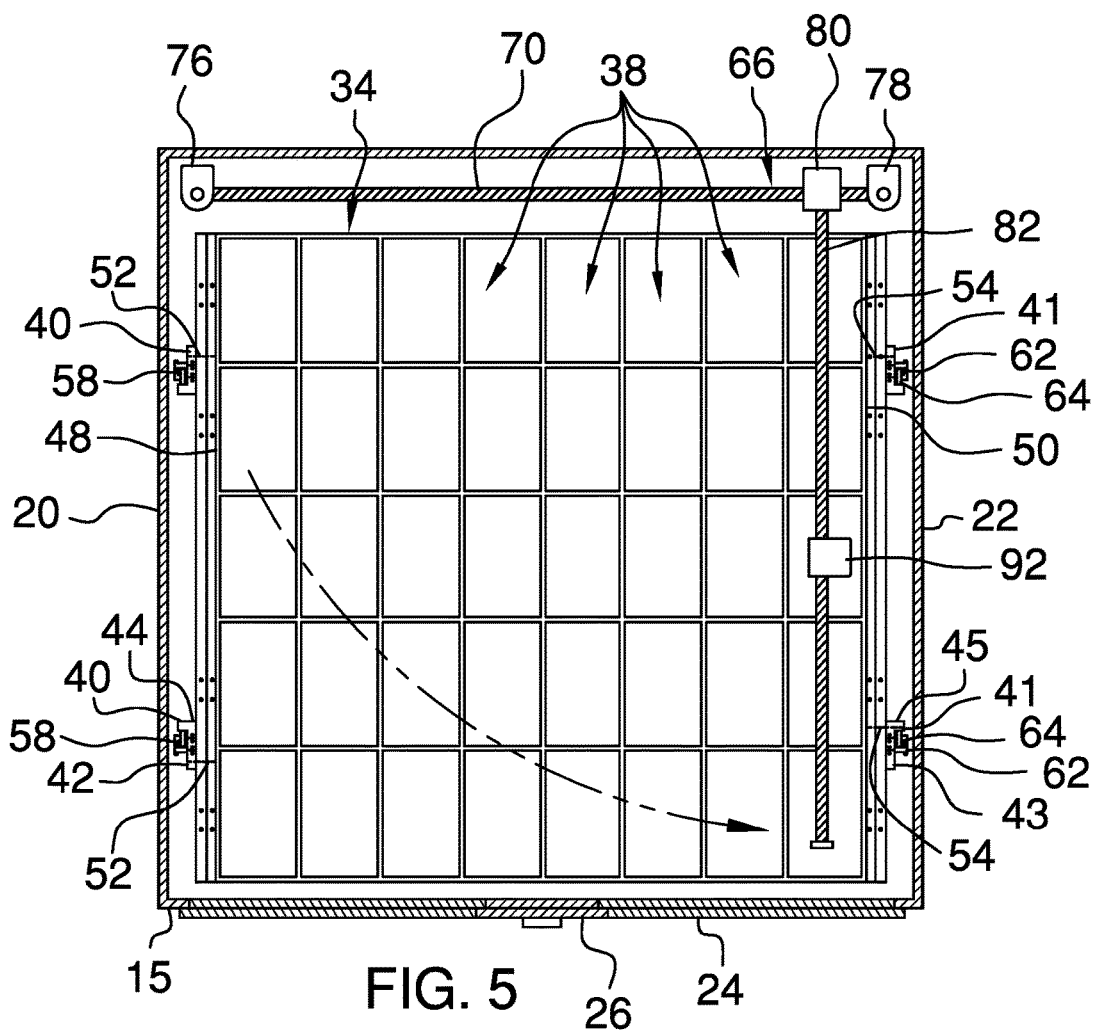
FIG. 5 is a cross sectional view taken along line 5-5 of FIG. 4 of an embodiment of the disclosure.
Figure 6:
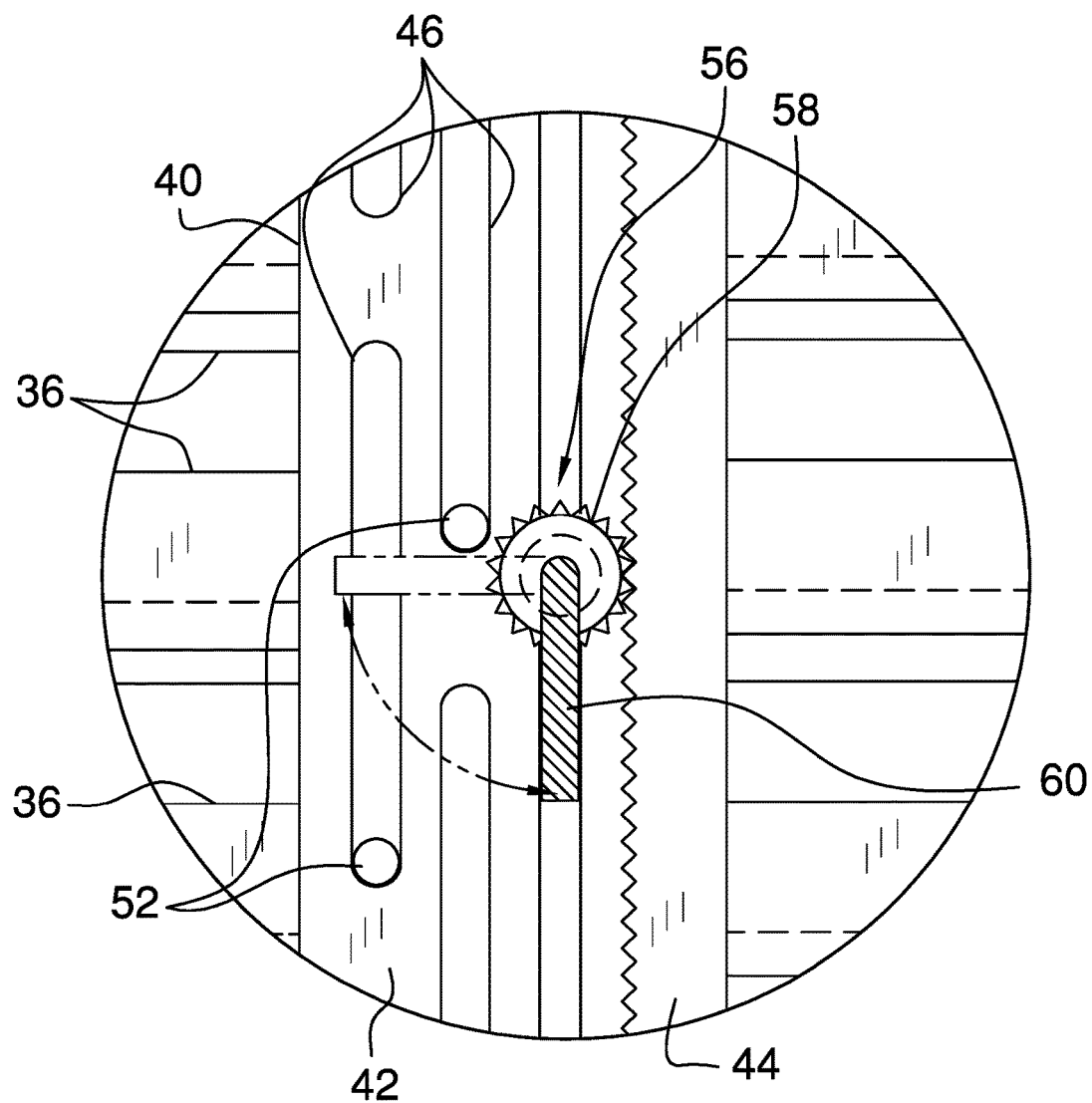
FIG. 6 is a detail view taken from circle 6 of FIG. 4 of an embodiment of the disclosure.
Figure 7:
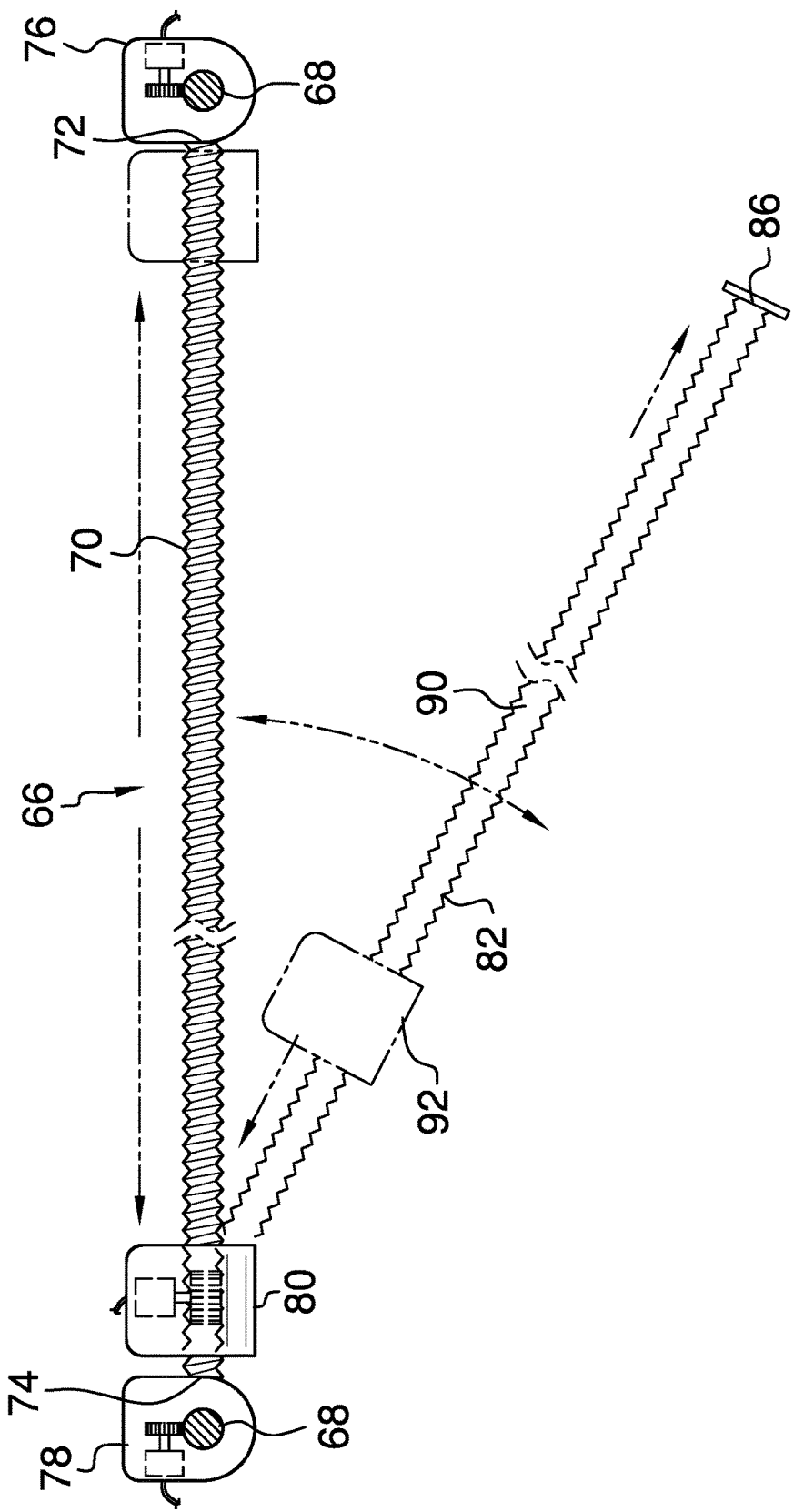
FIG. 7 is a top perspective view of a retrieval unit of an embodiment of the disclosure.
Figure 8:
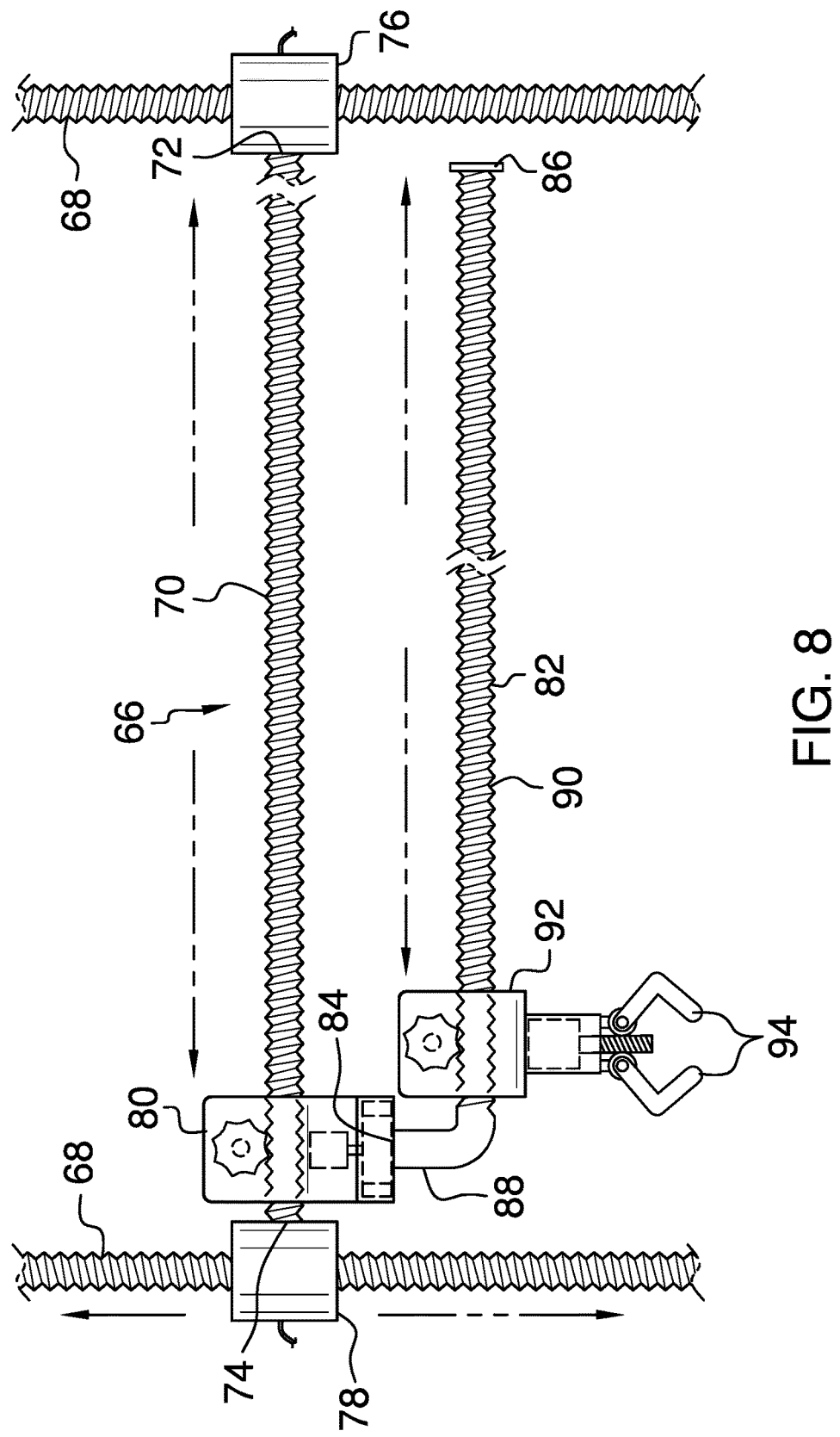
FIG. 8 is a front perspective view of a retrieval unit of an embodiment of the disclosure.
Figure 9:
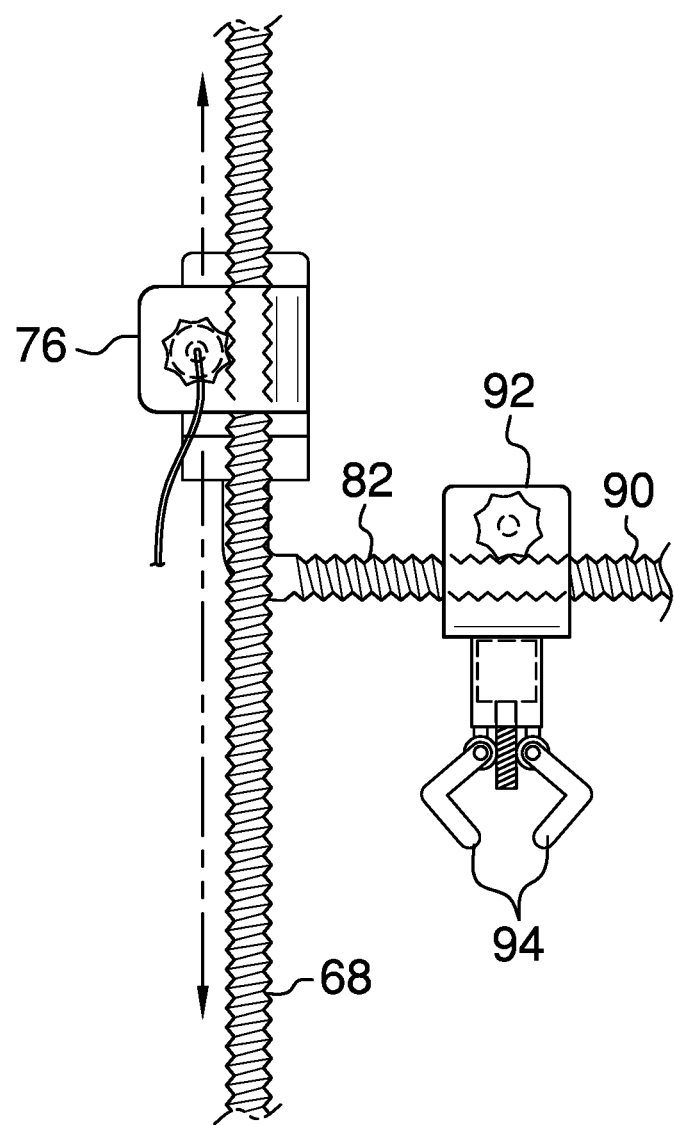
FIG. 9 is a side perspective view of retrieval unit of an embodiment of the disclosure.
Figure 10:
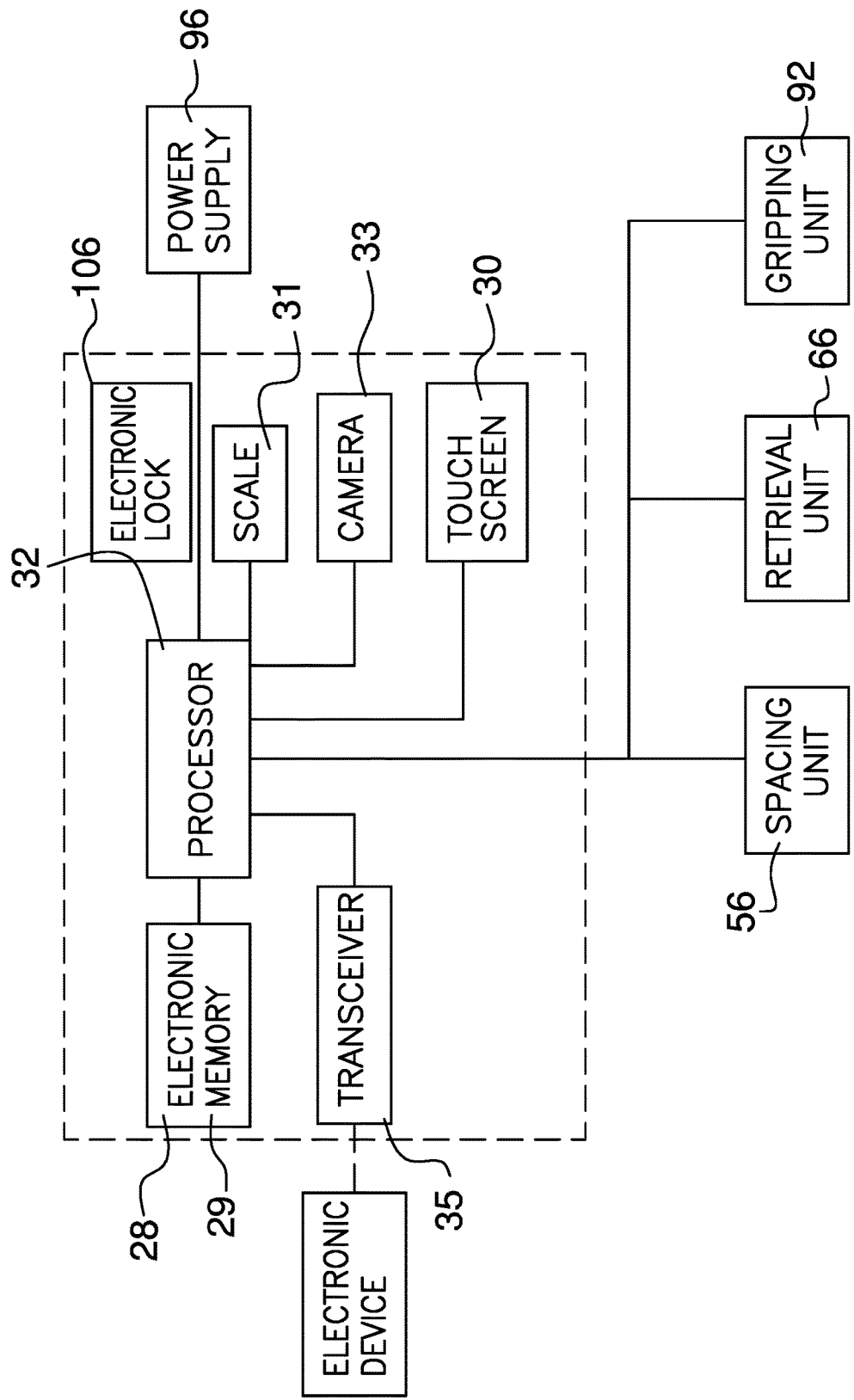
FIG. 10 is a schematic view of an embodiment of the disclosure.

With reference now to the drawings, and in particular to FIGS. 1 through 10 thereof, a new storage device embodying the principles and concepts of an embodiment of the disclosure and generally designated by the reference numeral 10 will be described.

As best illustrated in FIGS. 1 through 10, the robotic storage assembly 10 generally comprises a safe 12 that may contain a plurality of items. The safe 12 has an outer wall 14. The outer wall 14 has a front side 15, a top side 16, a bottom side 18, a first lateral side 20 and a second lateral side 22. The front side 15 is open to access an interior of the safe 12. A door 24 is hingedly coupled to the front side 15 to open and close the safe 12. The door 24 is selectively locked to prevent unauthorized access to the safe 12.

A drawer 26 is slidably coupled to the safe 12 and the drawer 26 is positioned in the front side 15. A control 28 is coupled to the safe 12 and the control 28 may be manipulated. The control 28 may be positioned on the top side 16. The control 28 comprises a touch screen 30 that is coupled to the control 28 and the touch screen 30 may be manipulated. A processor 32 is positioned within the control 28 and the processor 32 is electrically coupled to the touch screen 30. The processor 32 may be an electronic processor 32 or the like.

An electronic memory 29 is positioned in the control 28 and the electronic memory 29 is electrically coupled to the processor 32. The electronic memory 29 stores an inventory database. A scale 31 is coupled to the drawer 26 and the scale 31 is electrically coupled to the processor 32. The scale 31 may comprise a digital scale or the like. A camera 33 is coupled to the drawer 26 and the camera 33 is electrically coupled to the processor 32. The camera 33 may comprise a digital camera or the like.

A transceiver 35 is positioned in the control 28 and the transceiver 35 is electrically coupled to the processor 32. The transceiver 35 may be in wireless communication with an extrinsic electronic device. Thus, the inventory database may be communicated to the extrinsic electronic device. The extrinsic electronic device may comprise a personal computer or the like. The transceiver 35 may comprise a radio frequency transceiver or the like.

The touch screen 30 may comprise a thumb print reader thereby facilitating the touch screen 30 to read a thumbprint. The touch screen 30 may comprise a numerical pad thereby facilitating a numerical code to be entered. The touch screen 30 may comprise a bar code scanner thereby facilitating the touch screen 30 to read a bar code. Additionally, the touch screen 30 may selectively display images.

A storage unit 34 is positioned within the safe 12 and the storage unit 34 may contain the plurality of items. The storage unit 34 includes a plurality of trays 36. Each of the trays 36 is movably positioned within the safe 12. The trays 36 are selectively spaced apart from each other. Each of the trays 36 includes a plurality of boxes 38. Each of the trays 36 may be numbered and each of the boxes 38 in each of the trays 36 may be numbered. Each of the boxes 38 of an associated tray 36 is selectively removable from the associated tray 36. Each of the trays 36 is removable through the front side 15 of the safe 12 when the door 24 is opened.

The storage unit 34 comprises a set of first rails 40. Each of the first rails 40 is coupled between the bottom side 18 and the top side 16 of the safe 12. The first rails 40 are spaced apart from each other and each of the first rails 40 is spaced from the first lateral side 20. Each of the first rails 40 has a first portion 42 forming an angle with an engaging portion 44. Thus, each of the first rails 40 has an L-shaped cross section taken perpendicular to a longitudinal axis. The first portion 42 of each of the first rails 40 has a plurality of slots 46 extending therethrough. The slots 46 is spaced apart from each other and distributed longitudinally along each of the first rails 40.

A set of second rails 41 is provided. Each of the second rails 41 is coupled between the bottom side 18 and the top side 16 of the safe 12. The second rails 41 are spaced apart from each other and each of the second rails 41 is spaced from the second lateral side 22. Each of the second rails 41 has a first portion 43 forming an angle with an engaging portion 45. Thus, each of the second rails 41 has an L-shaped cross section taken perpendicular to a longitudinal axis. The first portion 43 of each of the second rails 41 has a plurality of slots 47 extending therethrough. The slots 47 are spaced apart from each other and distributed longitudinally along each of the second rails 41.

Each of the trays 36 has a first side 48 and a second side 50. Each of the boxes 38 may contain the items. The first side 48 of each of the trays 36 is aligned with the set of first rails 40. The second side 50 of each of the trays 36 is aligned with the set of second rails 41. The trays 36 are vertically stacked between the first rails 40 and the second rails 41.

Each of the trays 36 includes a set of first pins 52 and each of the first pins 52 is coupled to the first side 48. Each of the first pins 52 extends through an associated one of the slots 46 in a corresponding one of the first rails 40. Each of the trays 36 further includes a set of second pins 54. Each of the second pins 54 is coupled to the second side 50. Each of the second pins 54 extends through an associated one of the slots 46 in a corresponding one of the second rails 41.

A spacing unit 56 is provided. The spacing unit 56 is positioned within the safe 12 and the spacing unit 56 engages the plurality of trays 36. The spacing unit 56 selectively spaces the trays 36 apart from each other. The spacing unit 56 is electrically coupled to the control 28. Thus, the control 28 controls operational parameters of the spacing unit 56.

The spacing unit 56 comprises a pair of first drives 58. Each of the first drives 58 is slidably coupled to an associated one of the first rails 40. Each of the first drives 58 is electrically coupled to the processor 32. Each of the first drives 58 engages the engaging surface of the associated first rail. Thus, each of the first drives 58 selectively climbs and descends the associated first rail. Each of the first drives 58 may comprise an electrical motor and a gear or the like.

Each of the first drives 58 includes an arm 60. The arm 60 corresponding to each of the first drives 58 is selectively positioned in a stored position and a deployed position. The arm 60 extends downwardly from the corresponding first drive 58 when the arm 60 is positioned in the stored position. The arm 60 corresponding to each of the first drives 58 extends laterally away from the corresponding first drive 58 when the arm 60 is positioned in the deployed position.

The arm 60 of the corresponding first drive 58 engages an associated one of the first pin 52 of one of the trays 36 when the arm 60 is positioned in the deployed position. Each of the first drives 58 urges the associated first pin 52 upwardly in the associated slot. Thus, the first drive 58 lifts the trays 36 that are stacked on the selected tray 36 upwardly from the selected tray 36.

A pair of second drives 62 is provided and each of the second drives 62 is slidably coupled to an associated one of the second rails 41. Each of the second drives 62 is electrically coupled to the processor 32. Each of the second drives 62 engages the engaging surface of the associated second rail 41. Thus, each of the second drives 62 selectively climbs and descends the associated second rail 41. Each of the second drives 62 may comprise an electrical motor and a gear or the like.

Each of the second drives 62 includes an arm 64. The arm 64 corresponding to each of the second drives 62 is selectively positioned in a stored position and a deployed position. The arm 64 extends downwardly from the corresponding second drive 62 when the arm 64 is positioned in the stored position. The arm 64 corresponding to each of the second drives 62 extends laterally away from the corresponding second drive 62 when the arm 64 is positioned in the deployed position.

The arm 64 of the corresponding second drive 62 engages an associated one of the second pins 54 of a selected one of the trays 36 when the arm 64 is positioned in the deployed position. Each of the second drives 62 urges the associated second pin upwardly in the associated slot. Thus, each of the second drives 62 lifts the trays 36 that are stacked on the selected tray 36 to create a space between the trays 36 and the selected tray 36.

A retrieval unit 66 is provided and the retrieval unit 66 is positioned within the safe 12. The retrieval unit 66 is selectively positioned between the trays 36 when the trays 36 are spaced apart. Thus, the retrieval unit 66 may retrieve the items in the storage unit 34. The retrieval unit 66 is selectively aligned with the drawer 26. The retrieval unit 66 deposits the items in the drawer 26 thereby facilitating the items to be removed from the safe 12. The retrieval unit 66 is electrically coupled to the control 28.

The retrieval unit 66 comprises a pair of vertical rods 68. Each of the vertical rods 68 is vertically oriented to extend between the top side 16 and the bottom side 18 of the safe 12. The vertical rods 68 are spaced apart from each other and are distributed along the back side. Each of the vertical rods 68 is threaded.

A first horizontal rod 70 is provided and the first horizontal rod 70 has a first end 72 and a second end 74. A first motion unit 76 is coupled to the first end 72. The first motion unit 76 engages an associated one of the vertical rods 68. The first motion unit 76 urges the first horizontal rod 70 to selectively climb and descend the associated vertical rod. The first motion unit 76 is electrically coupled to the processor 32. The first motion unit 76 may comprise an electrical motor and a gear or the like. The gear may engage the first horizontal rod 70.

A second motion unit 78 is coupled to the second end 74. The second motion unit 78 engages an associated one of the vertical rods 68. The second motion unit 78 urges the first horizontal rod 70 to selectively climb and descend the associated vertical rod 68. The second motion unit 78 is electrically coupled to the processor 32. The second motion unit 78 may comprise an electrical motor and a gear or the like. The gear corresponding to the second motion unit 78 may engage the first horizontal rod 70.

A third motion unit 80 is coupled to the first horizontal rod 70. The third motion unit 80 selectively travels between the first end 72 and the second end 74 of the first horizontal rod 70. The third motion unit 80 is electrically coupled to the processor 32. The third motion unit 80 may comprise and electrical motor and a gear or the like. The gear corresponding to the third motion unit 80 may engage the first horizontal rod 70.

A second horizontal rod 82 is provided. The second horizontal rod 82 has a primary end 84 and a secondary end 86. The second horizontal rod 82 has a bend thereon to define a first portion 88 and a second portion 90 of the second horizontal rod 82. The primary end 84 is movably coupled to the third motion unit 80. The primary end 84 may be mechanically coupled to the electrical motor corresponding to the third motion unit 80.

The third motion unit 80 selectively positions the second horizontal rod 82 in a stored position. Thus, the second portion 90 is spaced from and is coextensive with the first horizontal rod 70. The third motion unit 80 selectively positions the second horizontal rod 82 in a deployed position. The second portion 90 extends laterally away from the first horizontal rod 70 when the trays 36 are spaced from the selected tray 36. Thus, the second portion 90 extends through the space between the trays 36 and the selected tray 36.

A gripping unit 92 is provided and the gripping unit 92 is coupled to the second horizontal rod 82. The gripping unit 92 is electrically coupled to the processor 32. The gripping unit 92 selectively travels along the second horizontal rod 82. The gripping unit 92 has a pair of fingers 94. The fingers 94 are movable toward each other. Thus, the fingers 94 may remove a selected one of the boxes 38 in the selected tray 36. The gripping unit 92 is selectively aligned with the drawer 26 to release the selected box 38 into the drawer 26. The gripping unit 92 may include an electrical motor. Each of the fingers 94 may be mechanically coupled to the electrical motor corresponding to the gripping unit 92 through any conventional means.

A power supply 96 is provided and the power supply 96 is coupled to the safe 12. The power supply 96 is electrically coupled to the processor 32. The power supply 96 comprises a power cord 98 extending outwardly from the safe 12. The power cord 98 has a distal end 100 with respect to the safe 12 and a plug 102 is electrically to the distal end 100. The plug 102 is selectively electrically coupled to a power source 104. The power source 104 may comprise an electrical outlet or the like.

An electronic lock 106 is provided. The electronic lock 106 is coupled to the drawer 26 and the electronic lock 106 selectively engages the front side 15 of the safe 12. Thus, the drawer 26 is locked in a closed position. The electronic lock 106 is electrically coupled to the processor 32. The electronic lock 106 may be an electronic lock of any conventional design.

In use, the selected box 38 is placed in the drawer 26. The items are placed in the selected box 38 and the drawer 26 is closed. The touch screen 30 is manipulated to program a location of the selected box 38 with respect to a selected tray 36 into the inventory database. The scale 31 weighs the selected box 38 when the items are placed in the selected box 38. The weight of the selected box 38 is stored in the inventory database. The camera 33 records an image of the items in the selected box 38 and the image is stored in the inventory database.

The processor 32 actuates the spacing unit 56 to lift the trays 36 positioned above the selected tray 36. The processor 32 actuates the first motion unit 76 and the second motion unit 78 to travel upwardly along the vertical rods 68. The processor 32 actuates the first motion unit 76 to position the second horizontal rod 82 in the deployed position. Thus, the second horizontal rod 82 is aligned with the drawer 26. The processor 32 actuates the gripping unit 92 to retrieve the selected box 38 from the drawer 26. The processor 32 actuates the third motion unit 80 to position the second horizontal rod 82 in the stored position.

The processor 32 actuates each of the first motion unit 76 and the second motion unit 78 to urge the first horizontal rod 70 along the pair of vertical rods 68. Thus, the first horizontal rod 70 is aligned with the selected tray 36. The processor 32 actuates the third motion unit 80 to urge the second horizontal rod 82 into the deployed position. Thus, the second horizontal rod 82 extends over the selected tray 36. Additionally, the processor 32 actuates the third motion unit 80 to position the second horizontal rod 82 above the selected tray 36. The processor 32 actuates the gripping unit 92 to release the selected box 38 into the selected tray 36.

The processor 32 actuates the third motion unit 80 to position the second horizontal rod 82 in the stored position. The spacing unit 56 releases the trays 36 such that the trays 36 are again vertically stacked. The touch screen 30 is manipulated to select a tray 36 from which items are to be removed. The processor 32 actuates the spacing unit 56, the first motion unit 76, the second motion unit 78, the third motion unit 80 and the gripping unit 92 in reverse order with respect to depositing the items in the selected tray 36. The item(s) is removed from the selected box 38 when the gripping unit 92 deposits the selected box 38 in the drawer 26. The inventory database is updated each time items are added or removed from the safe 12. The inventory database may be selectively monitored on the extrinsic electronic device.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A robotic storage assembly being configured to selectively retrieve selected items from a safe, said assembly comprising:

a safe being configured to contain a plurality of items;

a drawer being slidably coupled to said safe;

a control being coupled to said safe wherein said control is configured to be manipulated;

a storage unit being positioned within said safe, said storage unit being configured to contain the plurality of items, said storage unit including a plurality of trays being movably positioned within said safe, said trays being selectively spaced apart from each other;

a spacing unit being positioned within said safe, said spacing unit engaging said plurality of trays, said spacing unit selectively spacing said trays apart from each other, said spacing unit being electrically coupled to said control;

a retrieval unit being positioned within said safe, said retrieval unit being selectively positioned between said trays when said trays are spaced apart wherein said retrieval unit is configured to retrieve the items in said storage unit, said retrieval unit being selectively aligned with said drawer wherein said retrieval unit is configured to deposit the items in said drawer thereby facilitating the items to be removed from said safe, said retrieval unit being electrically coupled to said control, wherein said retrieval unit comprises
    a pair of vertical rods, each of said vertical rods being vertically oriented to extend between said top side and said bottom side of said safe, said vertical rods being spaced apart from each other and distributed along said back side, each of said vertical rods being threaded, and
    a first horizontal rod, said first horizontal rod having a first end and a second end;
a processor:
a first motion unit being coupled to said first end, said first motion unit engaging an associated one of said vertical rods, said first motion unit urging said first horizontal rod to selectively climb and descend said associated vertical rod, said first motion unit being electrically coupled to said processor;
a second motion unit being coupled to said second end, said second motion unit engaging an associated one of said vertical rods, said second motion unit being electrically coupled to said processor;
a third motion unit being coupled to said first horizontal rod such that said third motion unit selectively travels between said first end and said second end of said first horizontal rod, said third motion unit being electrically coupled to said processor;
a second horizontal rod having a primary end and a secondary end, said second horizontal rod having a bend thereon to define a first portion and a second portion of said second horizontal rod;
said primary end being movably coupled to said third motion unit, said third motion unit selectively positioning said second horizontal rod in a stored position having said second portion being coextensive with said first horizontal rod;
said third motion unit selectively positioning said second horizontal rod in a deployed position having said second horizontal rod extending laterally away from said first horizontal rod when said tray are spaced from a selected tray having said second horizontal rod extending between said trays and said selected tray; and
a gripping unit being coupled to said second horizontal rod, said gripping unit being electrically coupled to said processor, said gripping unit selectively travelling along said second horizontal rod, said gripping unit having a pair of fingers, said fingers being movable toward each other, said fingers removing a selected one of said boxes in said selected tray, said gripping unit being selectively aligned with said drawer such that said fingers release said selected box into the drawer.

2. The assembly according to claim 1, wherein said control comprises:
a touch screen being coupled to said control wherein said touch screen is configured to be manipulated, and
said processor being positioned within said control, said processor being electrically coupled to said touch screen.

3. The assembly according to claim 1, wherein:
said safe has an outer wall, said outer wall having a front side, a top side, a bottom side, a first lateral side and a second lateral side, said front side being open to access an interior of said safe; and
said storage unit comprises a set of first rails, each of said first rails being coupled between said bottom side and said top side of said safe, said first rails being spaced apart from each other, each of said first rails being spaced from said first lateral side, each of said first rails having a first portion forming an angle with an engaging portion such that each of said first rails has an L-shaped cross section taken perpendicular to a longitudinal axis.

4. The assembly according to claim 3, wherein said first portion of each of said first rails has a plurality of slots extending therethrough, said slots being spaced apart from each other and distributed longitudinally along each of said first rails.

5. The assembly according to claim 1, wherein:
said safe has an outer wall, said outer wall having a front side, a top side, a bottom side, a first lateral side and a second lateral side, said front side being open to access an interior of said safe; and
said storage unit comprises a set of second rails, each of said second rails being coupled between said bottom side and said top side of said safe, said second rails being spaced apart from each other, each of said second rails being spaced from said second lateral side, each of said second rails having a first portion forming an angle with an engaging portion such that each of said second rails has an L-shaped cross section taken perpendicular to a longitudinal axis.

6. The assembly according to claim 5, wherein said first portion of each of said second rails has a plurality of slots extending therethrough, said slots being spaced apart from each other and distributed longitudinally along each of said second rails.

7. The assembly according to claim 1, wherein:
said storage unit includes a set of first rails and a set of second rails; and
each of said trays has a first side, a second side, and a plurality of boxes, each of said boxes being configured to contain the items, said first side of each of said trays being aligned with said set of first rails, said second side of each of said trays being aligned with said set of second rails, said trays being vertically stacked between said first rails and said second rails.

8. The assembly according to claim 7, wherein:
each of said first rails has a plurality of slots;
each of said second rails has a plurality of slots; and
each of said trays includes:
    a set of first pins, each of said first pins being coupled to said first side, each of said first pins extending through an associated one of said slots in a corresponding one of said first rails, and
    a set of second pins, each of said second pins being coupled to said second side, each of said second pins extending through an associated one of said slots in a corresponding one of said second rails.

9. The assembly according to claim 3, wherein
said spacing unit comprises a pair of first drives, each of said first drives being slidably coupled to an associated one of said first rails, each of said first drives being electrically coupled to said processor, each of said first drives engaging said engaging surface of said associated first rail such that each of said first drives selectively climbs and descends said associated first rail.

10. The assembly according to claim 9, wherein:
each of said first rails has a plurality of slots;

each of said trays includes a pair of first pins, each of said first pins extending through an associated one of said slots;

each of said first drives includes an arm, said arm corresponding to each of said first drives being selectively positioned in a stored position and a deployed position, said arm extending downwardly from said corresponding first drive when said arm is positioned in said stored position, said arm corresponding to each of said first drives extending laterally away from said corresponding first drive when said arm is positioned in said deployed position; and said arm of said corresponding first drive engaging an associated one of said first pins of a selected one of said trays when said arm is positioned in said deployed position, each of said first drives urging said associated first pin upwardly in said associated slot such that said first drive lifts said selected tray and trays being stacked on said selected tray upwardly from said selected tray.

11. The assembly according to claim 9, wherein a pair of second drives, each of said second drives being slidably coupled to an associated one of said second rails, each of said second drives being electrically coupled to said processor, each of said second drives engaging said engaging surface of said associated second rail such that each of said second drives selectively climbs and descends said associated second rail.

12. The assembly according to claim 11, wherein:

each of said second rails has a plurality of slots;

each of said trays includes a pair of second pins, each of said second pins extending through an associated one of said slots;

each of said second drives including an arm, said arm corresponding to each of said second drives being selectively positioned in a stored position and a deployed position, said arm extending downwardly from said corresponding second drive when said arm is positioned in said stored position, said arm corresponding to each of said second drives extending laterally away from said corresponding second drive when said arm is positioned in said deployed position; and said arm of said corresponding second drive engaging an associated one of said second pins of a selected one of said trays when said arm is positioned in said deployed position, each of said second drives urging said associated second pin upwardly in said associated slot such that each of said second drives lifts said trays being stacked on said selected tray upwardly from said selected tray.

13. A robotic storage assembly being configured to selectively retrieve selected items from a safe, said assembly comprising:

a safe being configured to contain a plurality of items, said safe having an outer wall, said outer wall having a front side, a top side, a bottom side, a first lateral side and a second lateral side, said front side being open to access an interior of said safe;

a drawer being slidably coupled to said safe;

a control being coupled to said safe wherein said control is configured to be manipulated, said control comprising:

a touch screen being coupled to said control wherein said touch screen is configured to be manipulated, and a processor being positioned within said control, said processor being electrically coupled to said touch screen;

a storage unit being positioned within said safe, said storage unit being configured to contain the plurality of items, said storage unit including a plurality of trays being movably positioned within said safe, said trays being selectively spaced apart from each other, said storage unit comprising:

a set of first rails, each of said first rails being coupled between said bottom side and said top side of said safe, said first rails being spaced apart from each other, each of said first rails being spaced from said first lateral side, each of said first rails having a first portion forming an angle with an engaging portion such that each of said first rails has an L-shaped cross section taken perpendicular to a longitudinal axis, said first portion of each of said first rails having a plurality of slots extending therethrough, said slots being spaced apart from each other and distributed longitudinally along each of said first rails, a set of second rails, each of said second rails being coupled between said bottom side and said top side of said safe, said second rails being spaced apart from each other, each of said second rails being spaced from said second lateral side, each of said second rails having a first portion forming an angle with an engaging portion such that each of said second rails has an L-shaped cross section taken perpendicular to a longitudinal axis, said first portion of each of said second rails having a plurality of slots extending therethrough, said slots being spaced apart from each other and distributed longitudinally along each of said second rails, and each of said trays having a first side, a second side, and a plurality of boxes, each of said boxes being configured to contain the items, said first side of each of said trays being aligned with said set of first rails, said second side of each of said trays being aligned with said set of second rails, said trays being vertically stacked between said first rails and said second rails, each of said trays including:

a set of first pins, each of said first pins being coupled to said first side, each of said first pins extending through an associated one of said slots in a corresponding one of said first rails, and a set of second pins, each of said second pins being coupled to said second side, each of said second pins extending through an associated one of said slots in a corresponding one of said second rails;

a spacing unit being positioned within said safe, said spacing unit engaging said plurality of trays, said spacing unit selectively spacing said trays apart from each other, said spacing unit being electrically coupled to said control, said spacing unit comprising:

a pair of first drives, each of said first drives being slidably coupled to an associated one of said first rails, each of said first drives being electrically coupled to said processor, each of said first drives engaging said engaging surface of said associated first rail such that each of said first drives selectively climbs and descends said associated first rail, each of said first drives including an arm, said arm corresponding to each of said first drives being selectively positioned in a stored position and a deployed position, said arm extending downwardly from said corresponding first drive when said arm is positioned in said stored position, said arm corresponding to each of said first drives extending laterally away from said corresponding first drive when said arm is positioned in said deployed position, said arm of said corresponding first drive engaging an associated one of said first pins of a selected one of said trays when said arm is positioned in said deployed position, each of said first drives urging said associated first pin upwardly in said associated slot such that said first drive lifts and trays being stacked on said selected tray upwardly from said selected tray; and a pair of second drives, each of said second drives being slidably coupled to an associated one of said second rails, each of said second drives being electrically coupled to said processor, each of said second drives engaging said engaging surface of said associated second rail such that each of said second drives selectively climbs and descends said associated second rail, each of said second drives including an arm, said arm corresponding to each of said second drives being selectively positioned in a stored position and a deployed position, said arm extending downwardly from said corresponding second drive when said arm is positioned in said stored position, said arm corresponding to each of said second drives extending laterally away from said corresponding second drive when said arm is positioned in said deployed position, said arm of said corresponding second drive engaging an associated one of said second pins of a selected one of said trays when said arm is positioned in said deployed position, each of said second drives urging said associated second pin upwardly in said associated slot such that each of said second drives lifts said trays being stacked on said selected tray upwardly from said selected tray;

a retrieval unit being positioned within said safe, said retrieval unit being selectively positioned between said trays when said trays are spaced apart wherein said retrieval unit is configured to retrieve the items in said storage unit, said retrieval unit being selectively aligned with said drawer wherein said retrieval unit is configured to deposit the items in said drawer thereby facilitating the items to be removed from said safe, said retrieval unit being electrically coupled to said control, said retrieval unit comprising:

a pair of vertical rods, each of said vertical rods being vertically oriented to extend between said top side and said bottom side of said safe, said vertical rods being spaced apart from each other and distributed along said back side, each of said vertical rods being threaded, a first horizontal rod, said first horizontal rod having a first end and a second end, a first motion unit being coupled to said first end, said first motion unit engaging an associated one of said vertical rods, said first motion unit urging said first horizontal rod to selectively climb and descend said associated vertical rod, said first motion unit being electrically coupled to said processor, a second motion unit being coupled to said second end, said second motion unit engaging an associated one of said vertical rods, said second motion unit being electrically coupled to said processor, a third motion unit being coupled to said first horizontal rod such that said third motion unit selectively travels between said first end and said second end of said first horizontal rod, said third motion unit being electrically coupled to said processor, a second horizontal rod having a primary end and a secondary end, said second horizontal rod having a bend thereon to define a first portion and a second portion of said second horizontal rod, said primary end being movably coupled to said third motion unit, said third motion unit selectively positioning said second horizontal rod in a stored position having said second portion being coextensive with said first horizontal rod, said third motion unit selectively positioning said second horizontal rod in a deployed position having said second horizontal rod extending laterally away from said first horizontal rod when said trays are spaced from said selected tray having said second horizontal rod extending between said trays and said selected tray, and a gripping unit being coupled to said second horizontal rod, said gripping unit being electrically coupled to said processor, said gripping unit selectively travelling along said second horizontal rod, said gripping unit having a pair of fingers, said fingers being movable toward each other, said fingers removing a selected one of said boxes in said selected tray, said gripping unit being selectively aligned with said drawer such that said fingers release said selected box into said drawer; and a power supply being coupled to said safe, said power supply being electrically coupled to said processor, said power supply comprising a power cord extending outwardly from said safe, said power cord having a distal end with respect to said safe, said distal end having a plug being electrically coupled thereto, said plug being selectively electrically coupled to a power source.

* * * * *